(12) United States Patent
Bryars (10) Patent No.: US 6,398,364 B1
(45) Date of Patent: Jun. 4, 2002

(54) OFF-AXIS IMAGE PROJECTION DISPLAY SYSTEM

(75) Inventor: Brett J. Bryars, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/414,751

(22) Filed: Oct. 6, 1999

(51) Int. Cl.[7] .............................................. G03B 21/00

(52) U.S. Cl. ........................................... 353/31; 353/20

(58) Field of Search ................................ 353/20, 31, 33, 353/34, 37; 349/7, 8, 9, 96

(56) References Cited

U.S. PATENT DOCUMENTS

| 4,127,322 A | 11/1978 | Jacobson et al. ............... 353/31 |
| 4,408,839 A | 10/1983 | Wiener-Avnear ............... 350/347 |
| 4,583,825 A | 4/1986 | Buzak .......................... 350/335 |
| 4,595,261 A | 6/1986 | Baasch et al. ................. 350/394 |
| 4,969,730 A | * 11/1990 | Van Den Brandt ............ 353/31 |
| 4,983,032 A | * 1/1991 | Van Den Brandt ............ 353/30 |
| 5,005,952 A | 4/1991 | Clark et al. ................... 350/335 |
| 5,044,732 A | 9/1991 | Kimura et al. ................. 359/53 |
| 5,115,305 A | 5/1992 | Baur et al. ..................... 358/60 |
| 5,124,818 A | 6/1992 | Conner et al. ................. 359/53 |
| 5,124,841 A | 6/1992 | Oishi ........................... 359/487 |
| 5,130,826 A | 7/1992 | Takanashi et al. ............. 359/40 |
| 5,134,507 A | 7/1992 | Ishii ............................. 359/94 |
| 5,150,237 A | 9/1992 | Iimura et al. .................. 359/73 |
| 5,157,523 A | 10/1992 | Yamagishi et al. ............ 359/41 |
| 5,184,237 A | 2/1993 | Iimura et al. .................. 359/63 |
| 5,231,522 A | 7/1993 | Sumiyoshi ..................... 359/53 |
| 5,245,451 A | 9/1993 | Wu et al. ...................... 359/55 |
| 5,250,214 A | 10/1993 | Kanemoto et al. ...... 252/299.01 |
| 5,251,068 A | 10/1993 | Oshima et al. ............... 359/634 |
| 5,264,951 A | 11/1993 | Takanashi et al. ............. 359/53 |
| 5,267,029 A | 11/1993 | Kurematsu et al. ............ 358/60 |
| 5,270,804 A | 12/1993 | Lach ............................ 358/62 |
| 5,285,268 A | 2/1994 | Nakagaki et al. ............ 348/760 |
| 5,305,146 A | 4/1994 | Nakagaki et al. ............ 359/634 |
| 5,325,137 A | 6/1994 | Konno et al. .................. 353/63 |
| 5,327,270 A | 7/1994 | Miyatake ....................... 359/63 |
| 5,347,382 A | 9/1994 | Rumbaugh .................... 359/84 |
| 5,374,968 A | 12/1994 | Haven et al. .................. 353/31 |
| 5,379,135 A | 1/1995 | Nakagaki et al. .............. 359/40 |
| 5,380,459 A | 1/1995 | Kanemoto et al. ...... 252/299.01 |
| 5,387,991 A | 2/1995 | Mitsutake et al. ............. 359/93 |
| 5,389,982 A | * 2/1995 | Lee ............................... 353/20 |
| 5,398,081 A | 3/1995 | Jones .......................... 348/742 |
| 5,400,179 A | 3/1995 | Ito ............................... 359/588 |

(List continued on next page.)

FOREIGN PATENT DOCUMENTS

| EP | 0266184 | 5/1988 |
| EP | 364043 | 4/1990 |
| JP | 11-231261 | * 8/1999 |

OTHER PUBLICATIONS

A.E. Rosenbluth, D.B. Dove, F.E. Doany, R.N. Singh, K.H. Yang, and M. Lu, "Contrast Properties of Reflective Liquid Crystal Light Valves in Projection Displays," IBM J. Res. Develop. vol. 42, No. 3/4, May/Jul. 1998, pp. 359–386.

Primary Examiner—William Dowling
(74) Attorney, Agent, or Firm—Workman Nydegger Seeley (57) ABSTRACT

An image projection display system is provided which utilizes an off-axis illumination configuration. A beam splitter is configured to direct a first light beam along a first optical path toward reflective imaging devices adapted to direct a second light beam along a second optical path to produce an image to be projected. Polarizing devices are interposed between the beam splitter and each imaging device, with the polarizing devices configured to allow passage of a first polarized component of the light beam while blocking passage of a second polarized component of the light beam. The display system provides a high contrast ratio and degree of brightness which significantly improves the final image quality projected to a display screen.

31 Claims, 2 Drawing Sheets

U.S. PATENT DOCUMENTS

| | | |
|---|---|---|
| 5,440,414 A | 8/1995 | Kersey et al. ............... 359/122 |
| 5,453,859 A | 9/1995 | Sannohe et al. .............. 359/63 |
| 5,459,593 A | 10/1995 | Ootaki ........................ 359/40 |
| 5,462,621 A | 10/1995 | Ishii .......................... 156/229 |
| 5,576,854 A | 11/1996 | Schmidt et al. ............... 359/40 |
| 5,579,138 A | 11/1996 | Sannohe et al. .............. 359/63 |
| 5,579,159 A | 11/1996 | Ito ............................ 359/487 |
| 5,594,591 A | 1/1997 | Yamamoto et al. ............. 349/5 |
| 5,600,487 A | 2/1997 | Kiyomoto et al. .......... 359/634 |
| 5,621,486 A | 4/1997 | Doany et al. ............... 348/756 |
| 5,621,832 A | 4/1997 | Yokoyama et al. ........... 385/48 |
| 5,625,491 A | 4/1997 | von Gunten et al. ....... 359/487 |
| 5,644,432 A | 7/1997 | Doany ........................ 359/634 |
| 5,658,060 A | 8/1997 | Dove .......................... 353/33 |
| 5,668,664 A | 9/1997 | Shishido .................... 359/634 |
| 5,670,030 A | 9/1997 | Solberg et al. ........ 204/192.26 |
| 5,676,854 A | 10/1997 | Inui et al. ..................... 216/24 |
| 5,777,673 A | 7/1998 | Yoshikawa .................. 348/337 |
| 5,777,789 A | 7/1998 | Chiu et al. .................. 359/494 |
| 5,777,796 A | 7/1998 | Burstyn ..................... 359/634 |
| 5,875,008 A | 2/1999 | Takahara et al. ............... 349/5 |
| 5,914,817 A | 6/1999 | Browning et al. .......... 359/634 |
| 6,036,318 A * | 3/2000 | Itoh ........................... 353/20 |
| 6,176,586 B1 * | 1/2001 | Hirose et al. ................. 353/31 |

\* cited by examiner

OFF-AXIS IMAGE PROJECTION DISPLAY SYSTEM

BACKGROUND OF THE INVENTION

1. The Field of the Invention

The present invention is related to image projection systems. More particularly, the present invention is related to an off-axis image projection display system that produces a high contrast ratio and degree of brightness which enhances the quality of a projected image.

2. The Relevant Technology

Traditional projection displays include various components such as a light source, illumination optics, projection optics, spatial light modulators for image formation, and a color splitting assembly. Generally, projection displays manipulate a light beam from the light source and separate the light beam into three color channels, each comprising one of the three primary colors, red, green, and blue. Each color channel is manipulated by the spatial light modulators to form the desired portion of the final image. The portions of the image formed by each color channel are then recombined to create the desired image which is projected upon a viewing screen.

Each component in the projection display has particular characteristics that are important to the operation of the projection display. For example, spatial light modulators or reflective imagers are necessary to generate the requisite image to be projected onto a screen by way of the projection optics. The reflective imagers can take various forms, such as liquid crystal light valves (LCLV's ), and more specifically, by way of example and not limitation, liquid crystal on silicon (LCOS) imagers. An LCLV includes a number of polarizing elements that manipulate light incident thereupon, such that the light reflected from the polarizing elements has different polarization states, which is dependent on the image to be projected. As such, LCLV's include drive circuitry to influence the polarizing element and therefore create the requisite image to be projected onto the viewing screen through use of the projection optics.

More specifically, the individual pixels of the LCLV are activated to an "on" state by the application of a voltage or signal to individual pixels, and the polarization of the light reflected from those pixels is rotated by 90° with respect to the light incident upon the LCLV. In the "off" state, the light which is reflected from the pixels has no rotation of the polarization state. The light reflected, whether from "on" or "off" state pixels, is recombined within the color splitter and redirected to the polarizing element. The polarizing element then acts as an analyzer and transmits light which has undergone a reversal of polarization state at the LCLV into the image projection optics to be projected upon a viewing surface, such as a screen. Since light which is not rotated in polarization by the LCLV is not transmitted to the image projection optics, the final image is formed from the selected pixels of the three imagers and includes the three primary colors. The dark spots on the image correspond to the location of the pixels in the "off" state or where the light is not transmitted by the polarizing element.

A major aspect of image quality in a projection display system is measured through a parameter known as the contrast ratio, which is defined as the ratio of the light transmitted through the system in the "on" state divided by the amount of light transmitted in the "off" state. The higher the contrast ratio, the better the overall quality of the image. A display should project a bright image relative to the ambient lighting conditions. High brightness of the "on" pixels enhances the contrast ratio and allows the projector to be used in a broader range of ambient lighting conditions, i.e., a darkened room is not required.

The properties and characteristics of the optical components of conventional projection display systems influence the light propagating through the system and reduce the contrast ratio. In convergent imaging systems utilizing color splitting assemblies, such as a Philips prism, a significant loss of contrast results from the interaction of the geometrical effect from skew rays that are partially depolarized as a result of reflection at the optical coatings, such as antireflection and dichroic coatings, and the total internal reflection (TIR) surfaces.

The contrast ratio is reduced by this depolarization state of the light from the operation of the polarizing beam splitter and color splitting assembly. As stated previous, the contrast ratio is the ratio of light transmitted through the system in the "on" state divided by the amount of light transmitted in the "off" state. More specifically, the contrast ratio is the ratio of wanted, such asp-polarized, to unwanted, s-polarized, polarization states of the light transmitted through the system (where s-polarization refers to light which has its polarization vector perpendicular to the direction of propagation, while p-polarization refers to light which has its polarization vector lying in the plane of propagation). Variations between the pure s or p polarization state cause a resultant effect on the system contrast ratio.

Generally, the polarization of light is modified through birefringent materials, i.e. a material whose refractive index varies as a function of direction. Birefringent materials are commonly used to form wave compensators or retardation plates. Quarter waveplates effectively introduce a relative phase shift of 90° in one of the polarization components of the incident beam as the light goes through the material one time, if the plate is oriented perpendicular to the optical axis (the axis of the direction of propagation of the beam). A quarter waveplate defines a thickness of a birefringent material wherein the difference in the refractive index between the fast and slow axes results in a phase retardance of a quarter wavelength when comparing two beams of polarized light having their respective polarization vectors parallel to the fast and slow axes of the waveplate.

Various prior projection display systems have attempted to correct and control the effects of phase shift and/or diattenuation induced by depolarization by polarizing beam splitters, color splitting assemblies, and birefringent material.

Conventional reflective imaging systems, such as those disclosed in U.S. Pat. No. 5,459,593 to Ootaki, U.S. Pat. No. 5,594,591 to Yamamoto et al., and U.S. Pat. No. 5,327,270 to Miyatake, transmit light through a polarizing element, such as a polarizing beam splitter, that transmits or reflects a polarized component of the light to a color splitting assembly or color splitter. Light passing through the color splitting assembly to be incident on one or more LCLV's is affected by the antireflection and dichroic coatings formed within traditional color splitting assemblies. The use of conventional anti-reflection and dichroic coating designs in a color splitter changes the polarization state of light passing therethrough, thereby reducing image contrast and brightness. The phase change, or retardation, and intensity differences between polarization states transforms plane polarized light into elliptically polarized light. To correct for elliptical depolarization, Ootaki and Yamamoto define special optical coating designs, however, this is undesirable for practical manufacturing reasons, as the increased complexity of coating design, i.e., number of layers and total thickness and the control thereof, increases the manufacturing expenses.

In addition to the influence of the color splitting assembly, the polarizing beam splitter causes rotation of the polarization vector of plane polarized light. This, however may be somewhat accounted for through use of a quarter waveplate as described in Miyatake. The elliptical polarization, however, is not corrected by the quarter waveplate. The combination of rotation and ellipticity of the polarization vector is the major source of light leakage, which is transmitted as if the LCLV were in the "on" state when the reflective LCLV is in the "off" state, decreasing the contrast ratio and brightness, thereby detracting from the image quality.

A projection display system which avoids the use of a polarizing beam splitter is disclosed in U.S. Pat. No. 4,969,730 to van den Brandt, the disclosure of which is herein incorporated by reference. In the van den Brandt system, the input illumination travels through a linear polarizing element that controls the light to be incident upon an angle-dependent beam splitting element or prism. The system is configured such that light is reflected from the angle-dependent beam splitting element based on the properties of total internal reflection. The exiting light from the beam splitting element is not parallel or coincident with respect to the light reflected from the reflective imager, but is "off-axis" by a small angle. The light internally reflected is incident upon LCLV's that modulate the polarization state in accord with the imager "on" or "off" state. The van den Brandt patent includes a second linear polarizer, termed an analyzer, located between the beam splitter and the viewing screen, that transmits an image representing the modulation of the image pixels by controlling the passage of a particular polarization state of light to the viewing screen. Both the polarizer and the analyzer absorb all polarization states that are not to be transmitted therethrough.

In use, both the polarizer and the analyzer of van den Brandt are bombarded with light beams containing numerous non-transmissive polarization states over both visible and non-visible wavelengths. The continual absorption of high intensity non-transmissive polarization states deteriorates the effectiveness of the polarizer and/or analyzer, resulting in the passage of multiple polarization states or degradation induced optical absorption. As such, the contrast ratio is reduced and the overall life of the projection display system is significantly diminished.

Although, the van den Brandt off-axis system avoids the use of a polarizing beam splitter, the contrast is still diminished by imperfect polarization of skew rays, and their additional depolarization in the color splitting element, which occurs on reflection or transmission by the various optical coatings.

SUMMARY AND OBJECTS OF THE INVENTION

It is a primary object of the present invention to provide apparatus and methods for improving the contrast ratio in an image projection display system.

It is another object of the present invention to provide apparatus and methods for separating incident light into three colors with minimum loss of intensity at the desired wavelengths to form a color image of high brightness, while simultaneously achieving high contrast.

It is yet a further object of the present invention to provide systems and apparatus for separating incident light into three colors which are efficient and cost effective to manufacture.

Still another object of the present invention is to provide an image projection display system that is compact, simple and relatively inexpensive and easy to manufacture, yet achieves high contrast levels.

Yet another object of the present invention is to provide an image projection display system which require substantially no phase control coatings to achieve high contrast and brightness levels.

Still a further object of the present invention is to provide an image projection display system that has a longer useful life due to minimization of deterioration of components used therein.

These and other objects and features of the present invention will become more fully apparent from the following description and appended claims, or may be learned by the practice of the invention as set forth hereinafter.

To achieve the foregoing objects, and in accordance with the invention as embodied and broadly described herein, an image projection display system is provided that is substantially insensitive to the usually undesired depolarization effects of optical coatings or stress or thermal birefringence of optical components and assemblies. Through the use of an off-axis illumination configuration and reflective imagers each in optical communication with a respective polarizer, a high contrast ratio and degree of brightness is achieved which significantly improves the final image quality. The present invention is particularly useful in achieving enhanced contrast in reflective imaging systems such as those utilizing reflective liquid crystal on silicon (LCOS) imagers. The system of the invention minimizes or avoids the effects which arise from the rotations and ellipticity which occur in reflective imaging projection systems that reduce the contrast ratio by generating unwanted depolarization and contributing to light leakage.

In one embodiment, a beam splitter is configured to direct a first light beam along a first optical path toward at least one reflective imaging device adapted to direct a second light beam along a second optical path to produce an image to be projected. At least one polarizing device is interposed between the beam splitter and the imaging device, with the polarizing device configured to allow passage of a first polarized component of the light beam while blocking passage of a second polarized component of the light beam. In other embodiments, a color splitting assembly can be disposed along the first and second optical paths between the beam splitter and a plurality of reflective imaging devices and their respective polarizing filters to provide for color image production.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of th invention and are not therefore to be considered limiting of its scope, the invention will be described and explained with additional specificity and detail through the use of the accompanying drawings in which.

DETAILED DESCRIPTION OF THE INVENTION

The present invention is directed to apparatus and methods for improving the contrast ratio in an image projection display system that has one or more image panels or reflective imagers. The apparatus and methods provide for manipulation of propagating beams of light in an "off-axis" manner such that substantially only one polarized component of light is incident upon the reflective imagers, and only one polarized component of light is transmitted to a display screen. This provides for an increase in the contrast ratio, while eliminating the necessity for complex dichroic or antireflection coatings, or additional devices, to compensate for the detrimental effects of the depolarizing optical components.

The off-axis configuration utilized in the system of the invention maximizes the transmission of light polarized in the "on" state while minimizing light leakage of light polarized in the "off" state. This increases the contrast ratio by limiting the light loss within the system to only a function of the ratio of the low, or "off" optical power level (PL), to the high, or "on" optical power level (PH), commonly termed the extinction ratio, caused by one or more polarizers. The reduction of light leakage maximizes the darkness of the "off state" reflected light to achieve a high contrast ratio which significantly improves the final image quality.

In general, light entering the system of the invention passes into a beam splitter which delivers light to a color splitting assembly. The light contains unpolarized light, which is reflected to the color splitting assembly, such as a Philips prism, x-cube, or like color separation device. Upon entering the color splitting assembly, the incident light is separated into three color components such as the primary colors red, green, and blue. Each color component exits from the color splitting assembly along a first optical path toward a respective polarizing reflective imager or spatial light modulator, such as a liquid crystal display or liquid crystal light valve ("LCLV"), which generate the requisite image to be reflected to a display screen. Suitable LCLV's include liquid crystal on silicon imagers and ferroelectric liquid crystal displays.

Each color component passes through a polarizer positioned between the color splitting assembly and a respective imager, with each polarizer linearly polarizing the incident light in a first polarization state, preferably linearly polarized at a first angle dependent on the orientation of the polarizer. The reflective imagers selectively modulate the polarization state of the light incident on each pixel on reflection therefrom. Accordingly, if a linearly polarized component of light is initially passed by the polarizer to the imager, the light returned from the imager in the "on" state (which does not undergo a change in polarization direction) will pass through the polarizer on a second-pass and be transmitted through the system along a second optical path to the display screen.

Conventional color splitters virtually always introduce some depolarization into the transmitted light due to geometrical and thin film coating effects, the use of polarizing beam splitters or waveplate compensators, and/or the effects from birefringent materials forming the same. When transmitted by the color splitter, light has polarization properties different than the desired polarization state and thus, the presence of the depolarized light decreases the contrast ratio produced by the projection display system. As previously indicated, the contrast ratio is determined by dividing the transmitted light corresponding to the "on" state of the imager by the amount of light transmitted corresponding to the "off" state. Additionally, the contrast ratio of the light from a reflective imaging system is a measure of the purity of the polarization state of the transmitted light. The higher the contrast ratio, the better the overall quality of the image.

The contrast ratio is enhanced in the present invention without the need for polarizing beam splitters or one or more waveplate compensators. Furthermore, there is no need for dichroic or antireflection layers that include a specific or optimized phase control functionality.

Figure 1:
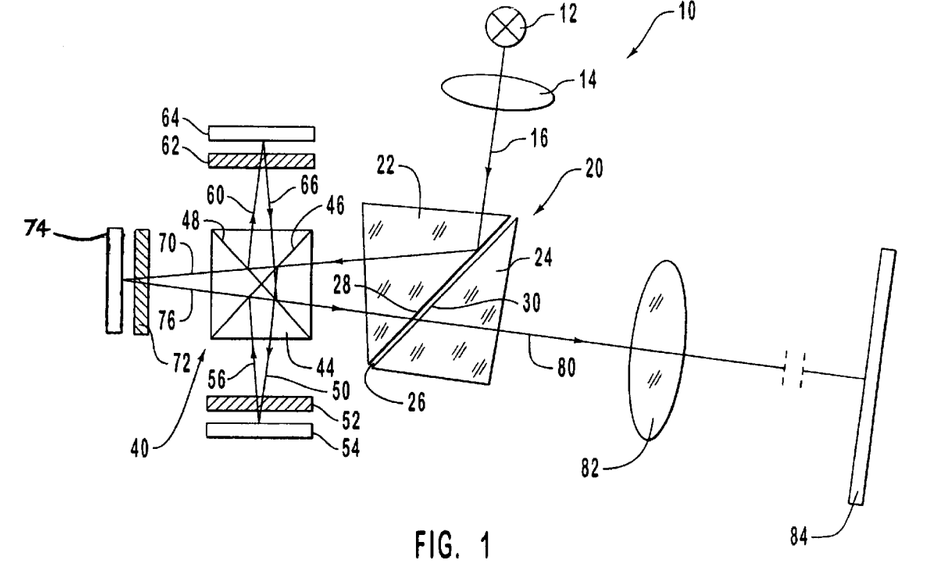
FIG. 1 is a schematic representation of an image projection display system according to one embodiment of the present invention.

Referring to the drawings, where like structures are provided with like reference designations, FIG. 1 is a schematic representation of an image projection display system according to one embodiment of the present invention. Although the embodiment shown in FIG. 1 is presented in the context of a display system that uses an X-cube prism, it will be appreciated that this is an example which is illustrative and not limiting.

The projection display system 10 receives input illumination from a light source 12, which may typically be white light from a xenon, metal-halide, or tungsten lamp. The light preferably passes through a light condenser system 14 which is schematically indicated by a single lens, although this system may include a plurality of lenses or mirrors. Additionally, condenser system 14 may incorporate a notch filter which tunes the wavelength range of the light required for the imaging system. Furthermore, condenser system 14 may include prepolarizers to initially control the polarization of the light provided by light source 12, as well as various filters, such as infrared or ultraviolet filters, to further limit the incident electromagnetic radiation delivered by light source 12. The prepolarizer may be selected from the group that includes a polarizing beam splitter, wire grid polarizer, circular polarizer, linear polarizer, and the like.

As shown in FIG. 1, a light beam 16 from light source 12 passes through condenser system 14 and is preferably directed to an angle-dependent beam splitter 20 comprising two transparent prisms 22 and 24 separated by a lower refractive index region 26 (such as air, low index optical adhesive, and the like) located therebetween. The prism 22 includes at least one angled surface 28 that is substantially parallel to a similar angled surface 30 of prism 24. The combination of the angular orientation of angled surface 28 and the refractive index of first prism 22 is such that light beam 16 incident thereupon is reflected towards a color splitting assembly 40. Specifically, since the index of refraction $n_m$ of the prism material ($n_m$ is for example 1.5) exceeds the index of refraction $n_a$ of air ($n_a=1.0$), light beam 16 incident on the interface of first prism 22 and the air layer at an angle $\theta_i$, which exceeds or is equal to what is commonly referred to as the critical angle $\theta_g$, will be totally internally reflected. When light beam 16 is incident on angled surface 28 at an angle less than the critical angle, light beam 16 is fully transmitted. In the embodiment of FIG. 1, the index of the refraction of first and second prisms 22, 24 and the orientation of the lower refractive index region 26 are selected such that light beam 16 originating from light source 12 is reflected in its totality by angled surface 28 towards color splitting assembly 40.

Additionally, the configuration of first and second prisms 22, 24 and lower refractive index region 26 is such that light incident upon first and second prisms 22, 24 from color splitting assembly 40 is totally transmitted therethrough, and is non-parallel, or "off-axis", with respect to the light beam incident on the color splitting assembly 40 from light source 12 arriving from the first and second prisms 22, 24. The angle of incidence of the light beams on angled surfaces 28, 30 is therefore larger or smaller than the critical angle. Generally, first and second prisms 22, 24 are formed from glass or a synthetic resin material, however, various other materials are appropriate in view of the teaching contained herein.

The particular configuration of beam splitter 20 assists in reducing the size of projection display system 10. Specifically, beam splitter 20 effects that the chief ray of a light beam 80, carrying the image to be displayed, encloses a wide angle, which may be near 90°, with the chief ray of light beam 16 reflected by beam splitter 20. Consequently, a projection lens system 82 can be positioned near the imagers, so that the length of the image projection arrangement can be considerably less than in the absence of beam splitter 20.

Light beam 16 reflected from beam splitter 20 is incident upon color splitting assembly 40. As depicted in FIG. 1, color splitting assembly 40 can take the form of an x-prism or dichroic cross 44. It will be appreciated by one skilled in the art that various other types of color splitting devices may be used, such as by way of example and not limitation, Philips prisms, L-prisms, tilted dichroic filters or mirrors, holographic filters, and the like. Additionally, other color splitting devices that are applicable are disclosed in co-pending application entitled "Color Separating Prism Assembly and Image Projection Display System" and filed on Oct. 6, 1999.

The dichroic cross 44 has two dichroic mirrors, a first dichroic mirror 46 and a second dichroic mirror 48, that are positioned substantially perpendicular to each other. Light beam 16 reflected from beam splitter 20 is incident on first dichroic mirror 46 that reflects, for example, blue light. A blue component of light 50, separated from light beam 16, is incident on a first polarizer 52 and then on a first imager 54 that contains the blue subimage to be projected.

The beam having a red and a green component of light is transmitted by first dichroic mirror 46 to be incident on second dichroic mirror 48. The second dichroic mirror reflects the red component of light 60 to a second polarizer 62 and subsequently to a second imager 64, which contains the red sub-image to be projected. The green component of light 70 is transmitted by second dichroic mirror 48 to a third polarizer 72 and a third imager 74 that contains the green sub-image.

Upon reflection from imagers 54, 64, and 74 color splitter assembly 40 functions in a reverse type mode to combine reflected components of light 56, 66, and 76 such that first dichroic mirror 46 and second dichroic mirror 48 reflect respective light beams to recombine the red, green, and blue reflected components of light 56, 66, and 76 to form a light beam 80. Light beam 80 passes through beam splitter 20 to be incident upon projection lens system 82, and is thereby projected onto a display screen 84.

To provide image projection using reflective imagers 54, 64 and 74 having a layer of liquid crystalline material, light beams 56, 66 and 76 incident on imagers 54, 64, and 74 must be polarized, preferably linearly polarized, since light source 12 generally radiates non 24 polarized light. Thus, the light that passes through each polarizer 52, 62 and 72 has its electric vector, taken at a fixed point in space, fixed in a specific direction, although its magnitude may vary. Each polarizer 52, 62, and 72 is preferably a linear polarizer that creates a linearly polarized component of light incident upon the respective imagers 54, 64 and 74. The polarizers 52, 62, and 72 are preferably located at the image planes between color splitting assembly 40 and reflective imagers 54, 64 and 74.

The polarizers prevent passage of light reflected from elements of the reflective imagers that are in the dark state or not energized, since such light has its polarization direction rotated by 90° and thus is blocked by the polarizers. In contrast, the light reflected from the elements of the imagers in the "on" state or energized is not rotated by 90°, and preferably has either no change in polarization or has rotation by 180°, or multiple thereof, and therefore passes through the polarizers to be transmitted to the display screen.

Each polarizer 52, 62 and 72 converts the polarization modulation of the beam into an intensity modulation. The projection lens system 82, which is shown schematically with one single lens element, displays the image from imagers 54, 64 and 74 on display screen 84. The optical path length between this screen and projection lens system 82 is relatively long. So as to limit the dimensions of the arrangement, the optical path between imagers 54, 64, and 74, and screen 84 can be folded with the aid of reflectors.

The pixels of the imager can not only be modulated digitally between two states as previously described, but may also be modulated between a multiplicity of intermediate states by applying an intermediate bias voltage such that the light is not rotated 90°, but is instead rotated an intermediate amount or is elliptically polarized. The relevant image element will not be sent or displayed on the display screen as a color or black pixel, but may have a substantially continuous variation in intensity thus forming an adjustable gray scale.

Instead of using linearly polarized light, an image projection system having liquid crystal display panels can in principle also be operated with circularly or elliptically polarized light. The image display panel can then change the direction of rotation of the circularly polarized light or the ratio between the elliptical axes of the elliptically polarized light.

If use is made of imagers in which the pixels in the "on" state rotate the polarization direction and in the "off" state do not rotate the polarization direction, the equivalent image can be projected by simply reversing the polarity of each pixel when driving the display.

It can be appreciated by one skilled in the art that the polarizing devices used in the present invention may take various forms, such as but not limited to, linear or circular polarizers, generally composed of a dyestuff dissolved in an orientated or birefringent organic polymer.

The use of single polarizers 52, 62, and 72 at each respective image plane between the color splitting assembly and the imagers avoids loss in contrast from leakage of skew rays, which is commonly a problem in conventional liquid crystal display based projection systems, including the off-axis system shown in U.S. Pat No. 4,969,730. The present configuration avoids the detrimental effects of prior off-axis systems in which elliptical depolarization and rotation of a light beam occurs from the phase change in transmission through or reflection from the coatings in the color separator, as well as that arising from stress or thermal birefringence in the color separator.

The configuration of the invention also has the advantage of reducing the radiation incident on the polarizers from the light source, which is beneficial since the polarizers are generally composed of an absorbing organic material. Infrared or heat radiation incident on the polarizers is reduced since the polarizers are positioned further away from the light source than in prior systems. Also, less radiation is absorbed by each polarizer since the color components of the light beam (red, green, blue) have already been separated by the color splitting assembly when the light is incident on each polarizer. Thus, deteriorization of the polarizers due to radiation absorption in the polarizers is minimized, thereby enhancing the life of the projection system, or providing equivalent performance in a harsher environment such as a more intense light source.

In the instant invention, color splitting assembly 40 has no effect on the resulting image contrast or brightness since an observer only perceives the intensity of the light beam, and not the polarization state. The intensity in the imager "on" and "off" states is unmodified by the depolarization of the polarized light transmitted by polarizer 52, 62 and 72 after reflection from imagers 54, 64 and 74, respectively.

In light of the teachings contained herein, one skilled in the art can identify various other configurations of projection display system 10. For example, it is alternatively possible to choose the orientation of angled surfaces 28, 30 and lower refractive index region 26 relative to the directions of light beams 16 and 80 in such a manner that light beam 16 is transmitted to imagers 54, 64 and 74, and light beam 80 is reflected towards projection lens system 82. This alternative configuration provides the advantage that during color beam projection, fewer color aberrations occur in the modulated beam.

Figure 2:
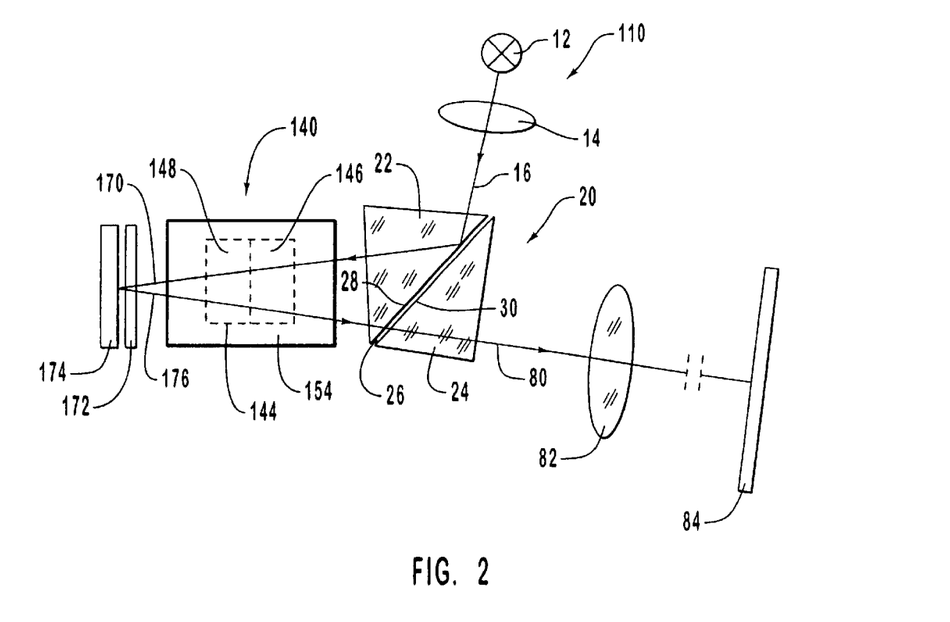
FIG. 2 is a schematic representation of an image projection display system according to an alternative embodiment of the present invention.

FIG. 2 is a schematic representation of an image projection display system 110 according to another embodiment of the present invention. The majority of features previously discussed with respect to projection display system 10 also apply to projection display system 110. The display system 110 has substantially the same optical components as previously discussed, including a light source 12, a condenser system 14, a beam splitter 20, a projection lens system 82, and a display screen 84. However, the particular orientation of the color splitting assembly, the polarizers, and the reflective imagers is modified. Specifically, a color splitting assembly 140, polarizers 152, 162 and 172, and imagers 154, 164 and 174 are rotated 90° about an optical axis, generally corresponding to the path of light beam 80, from the configuration shown in FIG. 1.

The operation of projection display system 110 is substantially the same as display system 10, however, display system 110 is more compact since rectangular imagers 154 and 164 are oriented with respect to beam splitter 20 such that imagers 154 and 164 are located within the height of beam splitter 20. Additionally, the deviation in angle of incidence (AOI) of light beams 16 and 80 with a first dichroic mirror 146 and a second dichroic mirror 148 is reduced, thereby reducing the variation in transmitted color across the image field. The variation in transmitted color across the image field arises from the effects of spectral shift from the coatings on first and second dichroic mirror 146, 148 as the angle of incidence increases from the normal.

As with the embodiment of FIG. 1, projection display system 110 increases the contrast and brightness of the final image without the need for phase control coatings, waveplate compensators, or other similar requirements.

Figure 3:
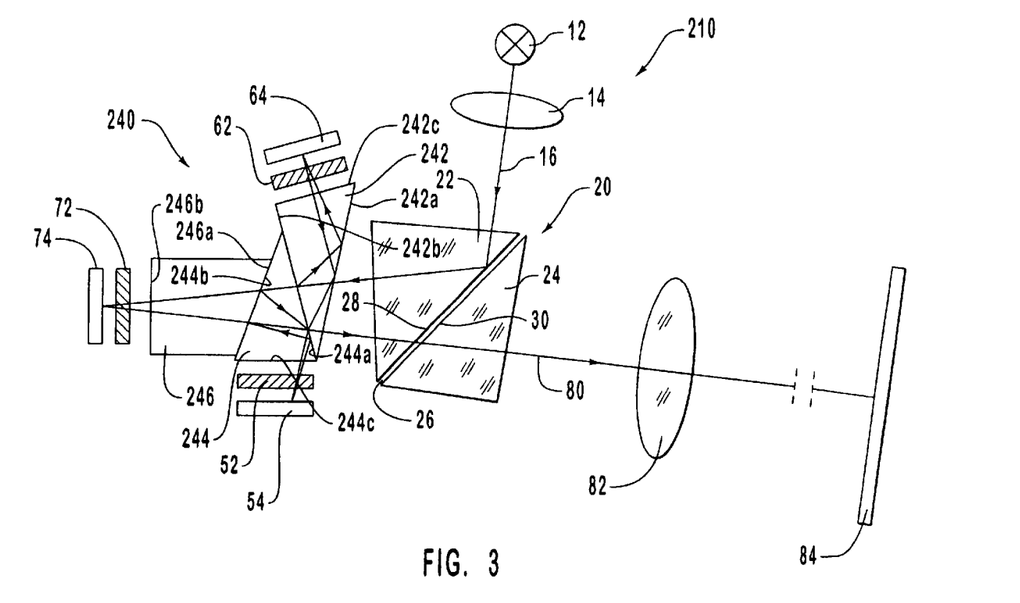
FIG. 3 is a schematic representation of an image projection display system according to another embodiment of the present invention.

FIG. 3 is a schematic representation of an image projection display system 210 according to a further embodiment of the present invention. The majority of features 11 previously discussed with respect to projection display system 10 also apply to projection display system 210. Thus, display system 210 has a light source 12, a condenser system 14, a beam splitter 20, a projection lens system 82, and a display screen 84. However, a color splitting assembly 240 is provided in the form of a Philips prism. The color splitting assembly 240 includes a first triangular prism 242, a second triangular prism 244, and a third prism 246 having a quadrangular profile. The triangular prisms 242 and 244 are positioned with respect to each other to provide an air gap (not shown) at their interface. The second triangular prism 244 and third prism 246 are optically cemented at the interface of these prisms with no air gap.

During operation of display system 210, prism 242 receives an incident light beam 16 at an incident surface 242a thereof. The first prism 242 has a dichroic coating (not shown) on a first color splitting surface 242b which is opposite incident surface 242a. The dichroic coating defines the wavelength range for a first color channel, and is generally a dichroic multilayer thin film designed to reflect and transmit discrete wavelength ranges. Light reflected by this dichroic coating is totally internally reflected at surface 242a toward an exit surface 242c and is transmitted through exit surface 242c. Light of a first color such as red is thereby selected and directed through a polarizer 62, such as a linear polarizer, to an imager 64.

The prism 244 is attached at an incident surface 244a to surface 242b of first prism 242 so as to form a precise air gap therebetween. The second prism 244 has a dichroic coating (not shown) on a second color splitting surface 244b opposite the air gap. This dichroic coating defines the wavelength range for a second color channel in projection display system 210. Light reflected at surface 244b exits second prism 244 at an exit surface 244c after total internal reflection at surface 244a. Light of a second color such as blue is thereby selected and directed through a polarizer 52 to an imager 54.

The third prism 246 has an incident surface 246a which is optically bonded or cemented to surface 244b of second prism 244 and is in contact with the dichroic coating on surface 244b. A third color channel is defined by the remaining wavelengths of light which pass into prism 246 from prism 244 that have not been subtracted from the incident beam by the preceding dicliroic coatings in the physical path of the light. Light of a third color such as green exits third prism 246 at an exit surface 246b and is directed to an imager 74 by way of a polarizer 72.

The light which has been separated into the three primary colors (red, green, blue) by color splitting assembly 240 and directed toward the imagers 54, 64 and 74 through the respective polarizers 52, 62 and 72 is reflected back through each prism in an off-axis manner. The light reflected from the imagers is recombined within color splitting assembly 240 and redirected to beam splitter 20, which transmits the light to the projection optics. The imagers are preferably configured such that when individual pixels are in the "off" state, they rotate by 90° the polarization of incident light upon reflection, with respect to the linear polarizer. The light which strikes pixels in the "on" state is not rotated in polarization upon reflection and thus passes back through the polarizers to the projection optics.

Figure 4:
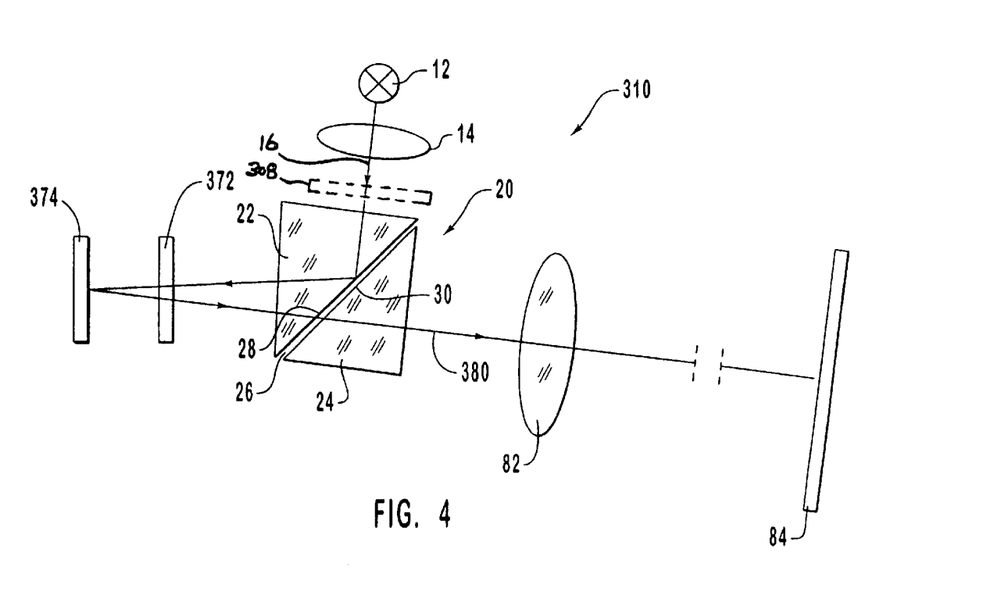
FIG. 4 is a schematic representation of an image projection display system according to a further embodiment of the present invention.

FIG. 4 is a schematic representation of an image projection display system 310 according to an alternative embodiment of the present invention. Many of the features previously discussed with respect to display system 10 also apply to projection display system 310. Thus, the display system 310, includes a light source 12, a condenser system 14, a beam splitter 20, a projection lens system 82, and a display screen 84, as previously discussed. Additionally, projection display system 310 has one polarizer 372 interposed between beam splitter 20 and an imager 374, which functions in substantially the same manner as the polarizers and imagers previously discussed.

The display system 310, however, is adapted for generation of either black or white, full gray scale, or time sequential color images. A time sequential color image is produced when the color of the incident light is modulated at a high rate that is imperceptible to the observer, the rate of modulation of color being synchronized with the imager modulation of the corresponding red, green and blue signals of the corresponding instantaneously perceived image by the viewer. Accordingly, as shown in FIG. 4, a time sequential color selection element 308 can be optionally positioned between condenser system 14 and beam splitter 20 when color imaging is desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An image projection display system, comprising:
    (a) a light source adapted to generate a first non-polarized light beam;
    (b) a beam splitter configured to direct the first light beam along a first optical path;
    (c) at least one reflective imaging device disposed in the first optical path and adapted to direct a second light beam along a second optical path to produce an image to be projected; and
    (d) at least one polarizing device interposed between the beam splitter and the imaging device, the polarizing device configured to receive at least a portion of the first non-polarized light beam and transmit a first polarized component of the first light beam while blocking passage of a second polarized component of the first light beam.

2. The display system of claim 1, wherein the beam splitter comprises a pair of prisms having an air gap therebetween.

3. The display system of claim 1, wherein the reflective imaging device is selected from the group consisting of a spatial light modulator, a liquid crystal light valve, a liquid crystal on silicon imager, and a ferroelectric liquid crystal display.

4. The display system of claim 1, wherein the polarizing device is a linear polarizer or a circular polarizer.

5. The display system of claim 1, wherein the polarizing device is composed of an absorptive material.

6. The display system of claim 1, further comprising a color splitting assembly disposed along the first and second optical paths between the beam splitter and the reflective imaging device.

7. The display system of claim 6, wherein the color splitting assembly is selected from the group consisting of an x-prism, Philips prism, L-prism, one or more dichroic filters, one or more dichroic mirrors, and a holographic filter.

8. The display system of claim 1, wherein the reflective imaging device is adapted for a continuous modulation of polarization states to transmit a substantially continuous gray scale image.

9. The display system of claim 1, wherein the reflective imaging device has a plurality of energizable imager elements adapted to modulate the first light beam such that light reflected from the imager elements that are not energized has a different polarization state than light reflected from the imager elements that are energized.

10. The display system of claim 1, wherein the reflective imaging device has a plurality of energizable imager elements adapted to modulate the first light beam such that light reflected from the imager elements that are not energized undergoes a rotation of polarization state, while light reflected from the imager elements that are energized does not change in polarization state.

11. A color image projection display system, comprising:
    (a) a light source adapted to generate a first non-polarized light beam;
    (b) a beam splitter configured to direct the first light beam along a first optical path;
    (c) a plurality of reflective imaging devices disposed in the first optical path and adapted to direct a sound light beam along a second optical path to produce an image to be projected;
    (d) a color splitting assembly disposed along the first and second optical path between the beam splitter and the reflective imaging devices; and
    (e) a plurality of polarizing devices interposed between the color splitting assembly and the reflective imaging devices, each of the polarizing devices configured to receive at least a portion of the first non-polarizing light beam and transmit a first polarized component of the first light beam while blocking passage of a second polarizing component of the first light beam.

12. The display system of claim 11, wherein the beam splitter comprises a pair of prisms having an air gap therebetween.

13. The display system of claim 11, wherein the reflective imaging devices are selected from the group consisting of a spatial light modulator, a liquid crystal light valve, a liquid crystal on silicon imager, and a ferroelectric liquid crystal display.

14. The display system of claim 11, wherein the polarizing devices are linear polarizers or circular polarizers.

15. The display system of claim 11, wherein the polarizing devices are composed of an absorptive material.

16. The display system of claim 11, wherein the color splitting assembly is selected from the group consisting of an x-prism, Philips prism, L-prism, one or more dichroic filters, one or more dichroic mirrors, and a holographic filter.

17. The display system of claim 11, wherein the reflective imaging devices are adapted for continuous modulation of polarization states to transmit a substantially continuous gray scale image.

18. The display system of claim 11, wherein the reflective imaging devices have a plurality of energizable imager elements adapted to modulate the first light beam such that light reflected from the imager elements that are not energized has a different polarization state than light reflected from the imager elements that are energized.

19. The display system of claim 11, wherein the reflective imaging devices have a plurality of energizable imager elements adapted to modulate the first light beam such that light reflected from the imager elements that are not energized undergoes a rotation of polarization state, while light reflected from the imager elements that are energized does not change in polarization state.

20. A color image projection display system, comprising:

(a) a light source adapted to generate a first non-polarized light beam;

(b) a beam splitter configured to direct the first light beam along a first optical path;

(c) a plurality of reflective imaging devices disposed in the first optical path and adapted to direct a second light beam along a second optical path to produce an image to be projected;

(d) a color splitting assembly disposed along the first and second optical paths between the beam splitter and the reflective imaging devices, the color splitting assembly adapted to cause the first light beam to split into a first color component, a second color component, and a third color component which are each directed to one of the reflective imaging devices;

(e) a plurality of polarizing devices each of which are interposed between the color splitting assembly and one of the reflective imaging devices, each of the polarizing devices configured to receive at least one of the color components of the first non-polarized light beam and transmit a first polarized component of one color component of the first light beam while blocking passage of a second polarized component of the transmitted color component of the first light beam;

(f) a projection lens arrangement for receiving the second light beam from the beam splitter; and (g) a display screen for receiving a projected image from the projection lens arrangement.

21. The display system of claim 20, wherein the beam splitter comprises a pair of prisms having an air gap therebetween.

22. The display system of claim 20, wherein the reflective imaging devices are selected from the group consisting of a spatial light modulator, a liquid crystal light valve, a liquid crystal on silicon imager, and a ferroelectric liquid crystal display.

23. The display system of claim 20, wherein the polarizing devices are linear polarizers or circular polarizers.

24. The display system of claim 20, wherein the polarizing devices are composed of an absorptive material.

25. The display system of claim 20, wherein the color splitting assembly is selected from the group consisting of an x-prism, Philips prism, L-prism, one or more tilted dichroic filters, one or more tilted dichroic mirrors, and a holographic filter.

26. The display system of claim 20, wherein the reflective imaging devices are adapted for continuous modulation of polarization states to transmit a substantially continuous gray scale image.

27. The display system of claim 20, wherein the reflective imaging devices have a plurality of energizable imager elements adapted to modulate the first light beam such that light reflected from the imager elements that are not energized has a different polarization state than light reflected from the imager elements that are energized.

28. The display system of claim 20, wherein the reflective imaging devices have a plurality of energizable imager elements adapted to modulate the first light beam such that light reflected from the imager elements that are not energized undergoes a rotation of polarization state, while light reflected from the imager elements that are energized does not change in polarization state.

29. The display system of claim 20, further comprising a light condenser system disposed between the light source and the beam splitter.

30. The display system of claim 29, wherein the light condenser system comprises components selected from the group consisting of infrared filters, ultraviolet filters, and combinations thereof.

31. The display system of claim 20, wherein the reflective imaging devices are oriented with respect to the beam splitter so as to be located within the height of the beam splitter.

* * * * *

UNITED STATES PATENT AND TRADEMARK OFFICE
CERTIFICATE OF CORRECTION

PATENT NO. : 6,398,364 B1
DATED : June 4, 2002
INVENTOR(S) : Brett J. Bryars

It is certified that error appears in the above-identified patent and that said Letters Patent is hereby corrected as shown below:

Column 2,
Line 21, after "such" change "asp-polarized" to -- as p-polarized --

Column 4,
Line 57, before "invention" change "th" to -- the --

Column 5,
Line 33, before "reflected" change ""of state"" to -- "off" state --

Column 6,
Line 19, after "display system" insert -- 10 --

Column 7,
Line 42, after "blue" change "subimage" to -- sub-image --
Line 45, after "mirror" insert -- 48 --
Line 65, after "radiates" change "non 24 polarized" to -- nonpolarized --

Column 9,
Line 67, after "features" delete "11"

Column 12,
Line 26, after "optical" change "path" to -- paths --.
Line 34, before "component" change "polarizing" to -- polarized --

Signed and Sealed this

Twenty-eighth Day of January, 2003

JAMES E. ROGAN
*Director of the United States Patent and Trademark Office*